United States Patent [19]

Regen et al.

[11] Patent Number: 5,359,647
[45] Date of Patent: Oct. 25, 1994

[54] HEADSET IN-USE INDICATOR

[75] Inventors: Paul L. Regen, Felton; Anna Marie G. Puentes, Los Gatos; Richard Hensolt, Ben Lomond, all of Calif.

[73] Assignee: Plantronics, Inc.

[21] Appl. No.: 69,294

[22] Filed: May 28, 1993

[51] Int. Cl.5 .................... H04M 11/00; H04M 1/00
[52] U.S. Cl. ......................................... 379/56; 379/58; 379/377
[58] Field of Search ............... 379/58, 59, 61, 56, 379/377, 387, 396, 430, 441, 442; 455/89, 90, 154.1, 159.2; 381/26, 74, 110

[56] References Cited

U.S. PATENT DOCUMENTS

| | | | |
|---|---|---|---|
| 4,558,178 | 12/1985 | Yasuda et al. | 379/373 |
| 4,633,498 | 12/1986 | Warnke et al. | 381/26 |
| 5,210,791 | 5/1993 | Krasik | 379/377 |

FOREIGN PATENT DOCUMENTS 0050653  5/1981  Japan ..................... 379/396

*Primary Examiner*—Curtis Kuntz
*Assistant Examiner*—I. S. Rana
*Attorney, Agent, or Firm*—Arnold, White & Durkee

[57] ABSTRACT

A headset telephone having an in-use indicator for notifying passers-by when the wearer of the headset is carrying on a telephone conversation. In one embodiment of the invention, an in-use indicator comprising a light-emitting diode is disposed on the end of the headset's voice boom, and is illuminated in response to activation of the headset. In another embodiment of the invention, activation of the headset causes a transmitter to transmit a signal to a remote in-use indicator not physically connected to the remainder of the telephone system.

9 Claims, 7 Drawing Sheets

HEADSET IN-USE INDICATOR

FIELD OF THE INVENTION

This invention relates generally to the field of telephony, and more particularly to telephone headsets.

BACKGROUND OF THE INVENTION

Telephones having headset systems for allowing "hands-free" use are well known, and a great many telephone/headset systems are commercially available. In most cases, the handset, if any, of a telephone which has a headset, is left on-hook during headset use, or taken off-hook and left beside the phone. One problem with headset telephones, however, is that passers-by may be unaware that the user of a headset telephone is carrying on a conversation, and may therefore not afford the headset user the same common courtesies as when a telephone user is holding a telephone handset to his or her ear. On the other hand, passers-by who notice that a headset user is wearing a headset may incorrectly assume that the user is carrying on a telephone conversation, possibly causing the passers-by to take unnecessary steps such as speaking in hushed tones or foregoing face-to-face conversations with the headset wearer, in order to avoid interrupting the non-existent telephone conversation.

Such problems and inconveniences, although usually minor, can detract from the convenience and efficiency of hands-free telephone use.

SUMMARY OF THE INVENTION

In accordance with the present invention, a visual headset in-use indicator, comprising an LED or the like, is provided for a headset telephone. The indicator is illuminated when the user is conversing over the headset, so that passers-by are made aware of the telephone conversation, and can extend the usual telephone courtesies only when appropriate.

BRIEF DESCRIPTION OF THE DRAWINGS

The foregoing and other aspects of the present invention will be best appreciated with reference to the detailed description of a specific embodiment of the invention, which follows, when read in conjunction with the accompanying drawings, wherein.

DETAILED DESCRIPTION OF A SPECIFIC EMBODIMENT OF THE INVENTION

Figure 1:
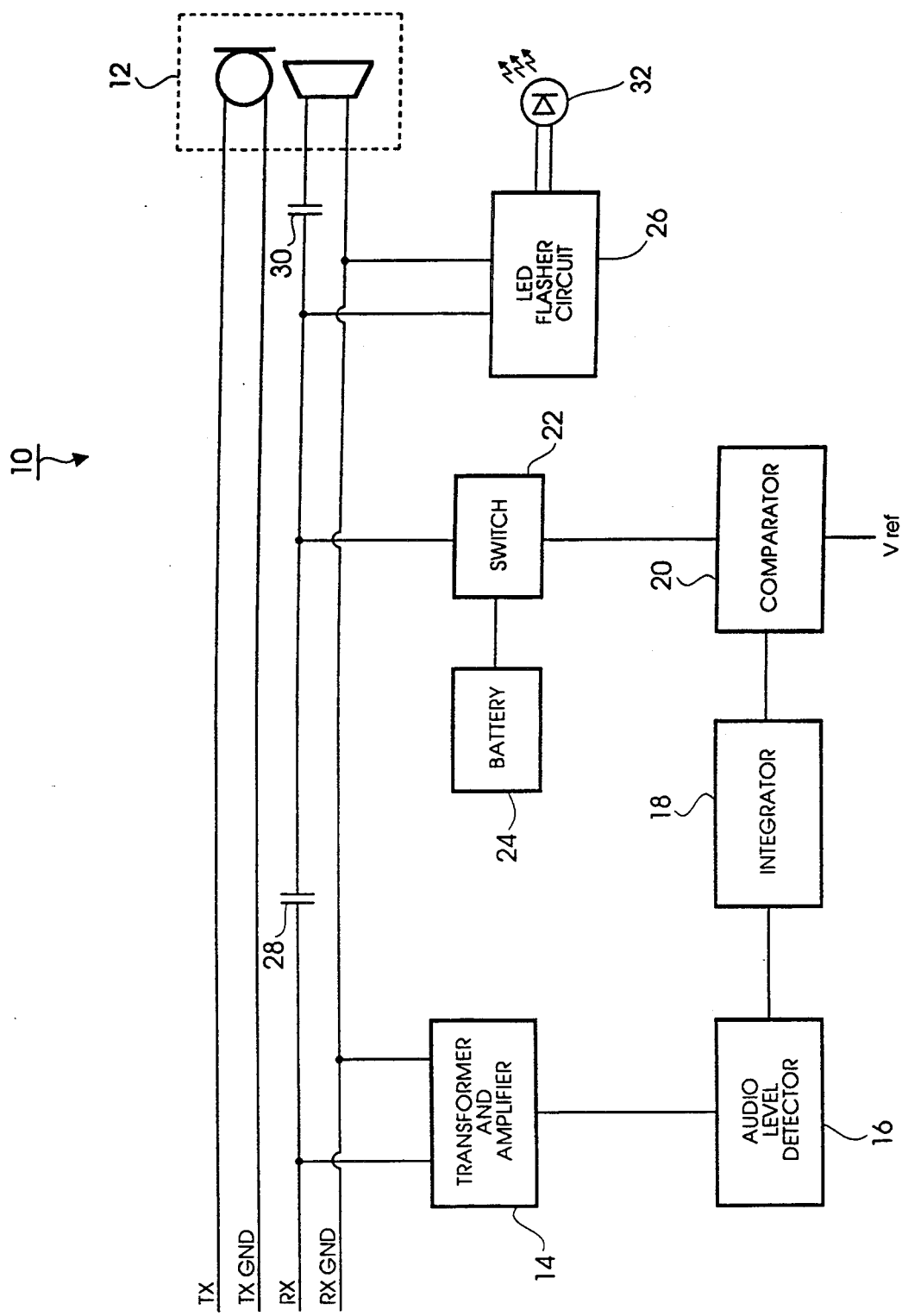
FIG. 1 is a block diagram of a telephone headset in-use indicator in accordance with one embodiment of the present invention.

Referring to FIG. 1, there is shown a block diagram of a telephone headset in-use indicator 10 in accordance with a preferred embodiment of the present invention. Also depicted in FIG. 1 is a telephone headset 12 including a receiver and a microphone. As would be appreciated by those of ordinary skill in the field of telephony, headset 12 is coupled to a telephone base unit (not shown) which provides a received audio signal on signal lines RX and RX GND, and which receives from headset 12 a transmit audio signal on lines TX and TX GND.

In accordance with the presently disclosed embodiment of the invention, in-use indicator circuit is transformer coupled to the RX and RX GND lines which are applied to headset 12. Specifically, a transformer and amplifier circuit 14 is coupled to the RX and RX GND lines, and functions to receive and amplify the incoming received audio signal.

The amplified received audio signal is provided to an audio level detector circuit 16 which converts received audio signal peaks which exceed a predetermined threshold into current pulses. In the presently preferred embodiment of the invention, the predetermined threshold of audio level detector circuit 16 is set to a level typical of an off-hook condition of the phone. That is, audio level detector circuit 16 preferably detects signals exceeding its predetermined threshold whenever the telephone and headset are in use.

With continued reference to FIG. 1, current pulses produced by audio level detector circuit 16 are conveyed to an integrator circuit 18 which produces a DC output signal that is proportional to the time average of current pulses produced by audio level detector circuit 16. The time constant of integrator 18 is preferably on the order of seconds, so that response to discrete noise transients on the received audio signal path is inhibited.

The integrator output voltage from integrator 18 is provided to a comparator circuit 20, which is also provided with a reference voltage input Vref. Comparator 20 produces a digital logic level activation signal to activate the in-use indicator whenever the integrator output signal exceeds the reference voltage Vref.

The activation signal produced by comparator circuit 20 is applied to a control input of a switch which is disposed between a battery 24 and the received audio signal line RX. Whenever the activation signal from comparator 20 is asserted, switch 22 is held in a closed position, so that a DC voltage from battery 24 is applied to the RX line. This DC voltage on the RX line is conducted to an LED flasher circuit 26, which is also connected to the RX GND line.

As would be appreciated by those of ordinary skill in the art, the DC voltage provided by battery 24 is superimposed upon the AC audio signal that is conducted on the RX line. This DC battery voltage is confined to a segment of the RX line between two DC blocking capacitors 28 and 30. Capacitors 28 and 30 do not prevent the conduction of the received audio signal from the telephone base unit to headset 12.

LED flasher circuit 26 provides current pulses to an LED in-use indicator 32 at a rate of two hertz or so. Power for LED flasher circuit 26 is provided from battery 24, through switch 22 and along the DC isolated segment of the RX line.

Operation of in-use indicator circuit 10 is as follows: When the telephone is "on-hook" (i.e., not in use), no received audio signal is conducted on the RX and RX GND signal lines to headset 12. In this condition, no signal is present to be amplified by amplifier 14, and therefore no audio level will be detected by detector 16. When the telephone is taken "off-hook", the received audio signal is amplified by amplifier, and the amplified signal is applied to level detector 16. Amplifier 14 is preferably has a very high gain, so that even a very low-level received audio signal on the RX line is sufficient, when amplified by amplifier 14, to exceed the threshold level of audio level detector 16. Thus, the in-use indicator will be able to indicate an in-use condition whenever the phone is taken off-hook, and not just when voices or other sounds are part of the received audio signal.

When the received audio signal exceeds the threshold of level detector 16, level detector 16 produces current pulses that are applied to integrator 18. The DC output of integrator 18 thus reflects the time-average of the current pulses produced by level detector 16. So long as current pulses continued to be produced by level detector 16 as a result of even small received audio signals on the RX line, the DC output of integrator 18 will exceed the reference voltage supplied to comparator 20. This causes comparator 20 to assert its output signal, closing switch 22. When switch 22 is closed, the DC voltage from battery 24 will be applied to the DC-isolated segment of the RX line, supplying power to LED flasher circuit 26.

When LED flasher circuit 26 receives DC power from the DC-isolated segment of the RX line, it will indicate an in-use condition of the telephone with a flashing LED 32. It is contemplated that another type of visual indicator, could be substituted in place of LED 32, as would be appreciated by those of ordinary skill in the art.

Figure 2:
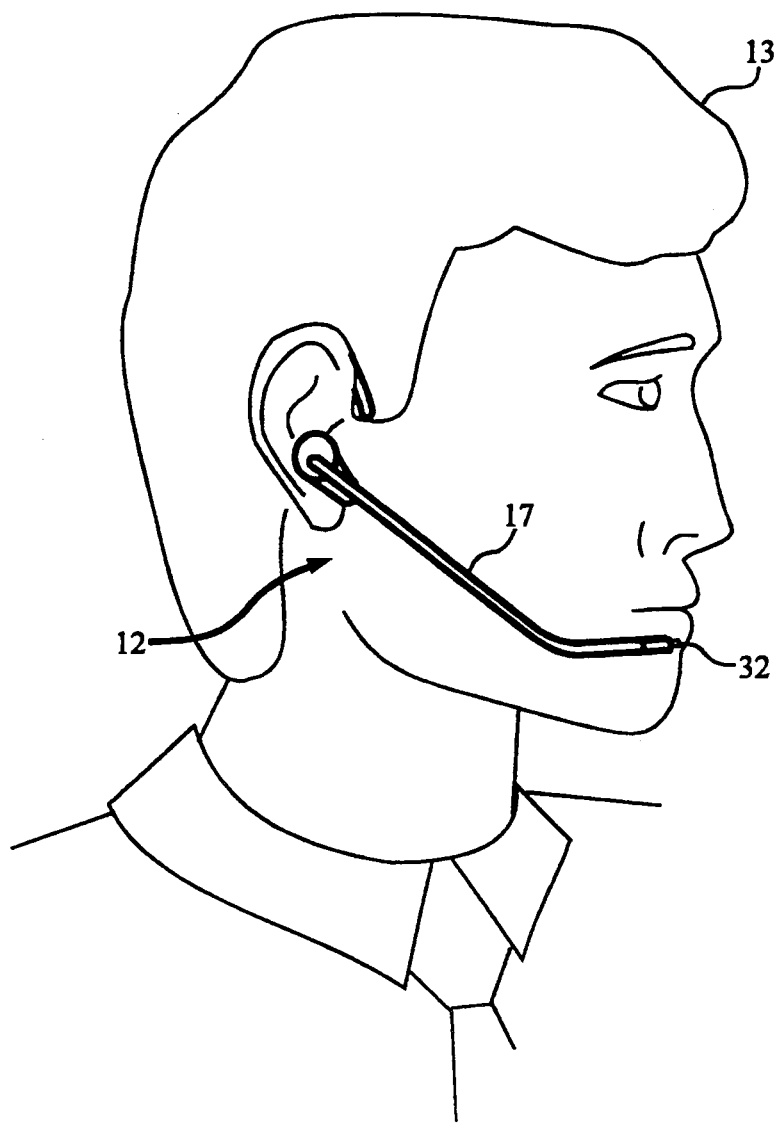
FIG. 2 is an illustration of a headset wearer wearing a headset incorporating the in-use indicator of FIG. 1.

Referring to FIG. 2, there is shown an illustration of a wearer 13 of headset 12, showing LED 32 disposed at the end of a voice-boom portion 17 of headset 12.

Figure 3:
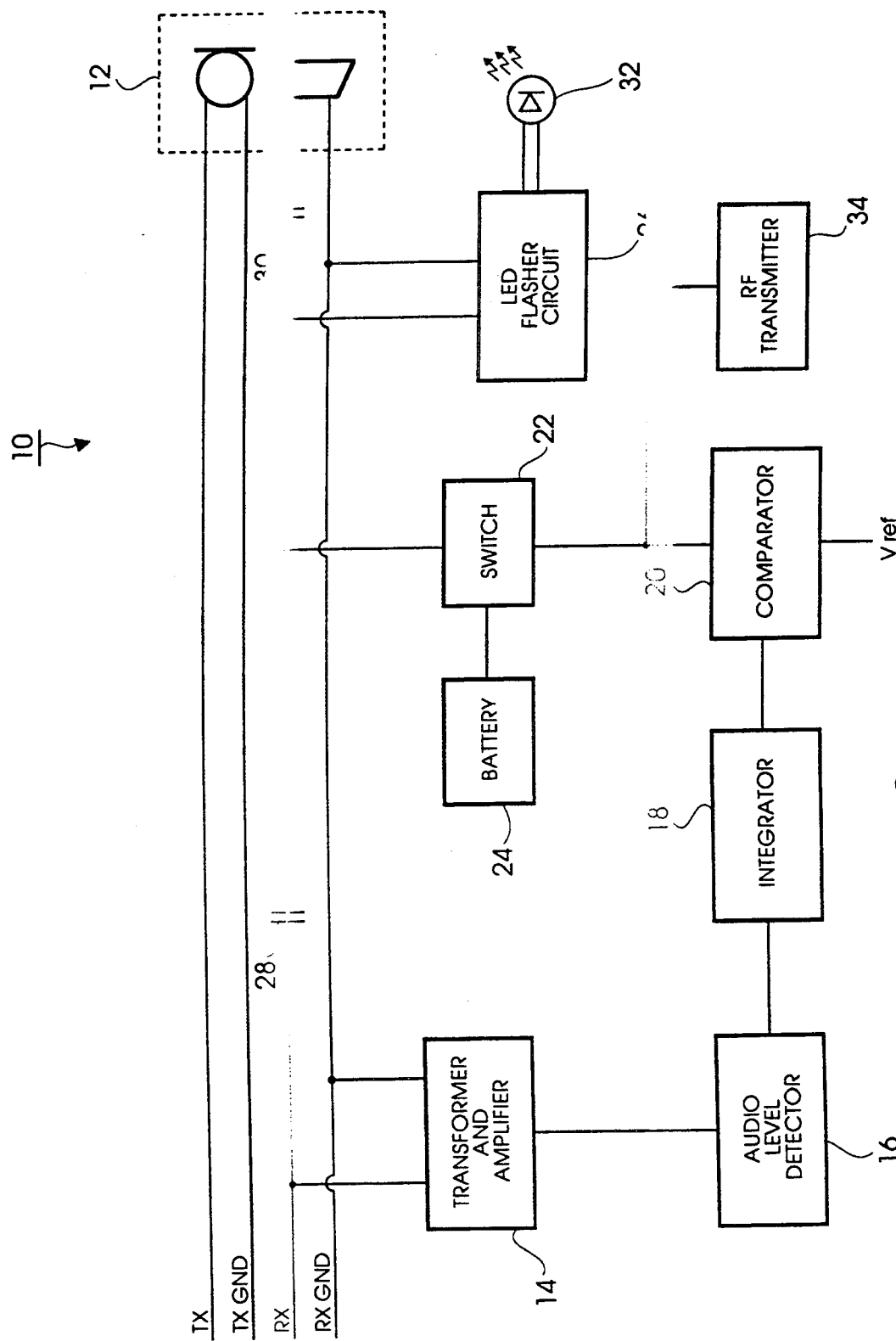
FIG. 3 is a block diagram of an alternative embodiment of an in-use indicator in accordance with the present invention.

In an alternative embodiment of the invention, depicted in the block diagram of FIG. 3, the activation signal produced by comparator 20 in response to detection of an audio signal by audio level detector 16 is provided to an RF transmitter circuit 34. In response to assertion of the activation signal by comparator 20, RF transmitter 34 transmits an RF signal to a receiver in an in-use indication device not physically connected to the phone system or headset. It is believed that any of the various RF transmitting/receiving arrangements that are known and/or commercially available would be suitable in the practice of the present invention.

In other alternative embodiments of the invention, it is further contemplated that an infrared transmitter or ultrasonic transmitter could be substituted in place of RF transmitter circuit 34 in FIG. 3. It is believed that various infrared or ultrasonic transmitter arrangements suitable for the purposes of practicing the present invention are known and/or commercially available. Employing either an RF, infrared, or ultrasonic transmitter in the block diagram of FIG. 3 would have the advantageous effect of eliminating the need for a physical connection between the headset and the visual indication of telephone use.

Figure 4:
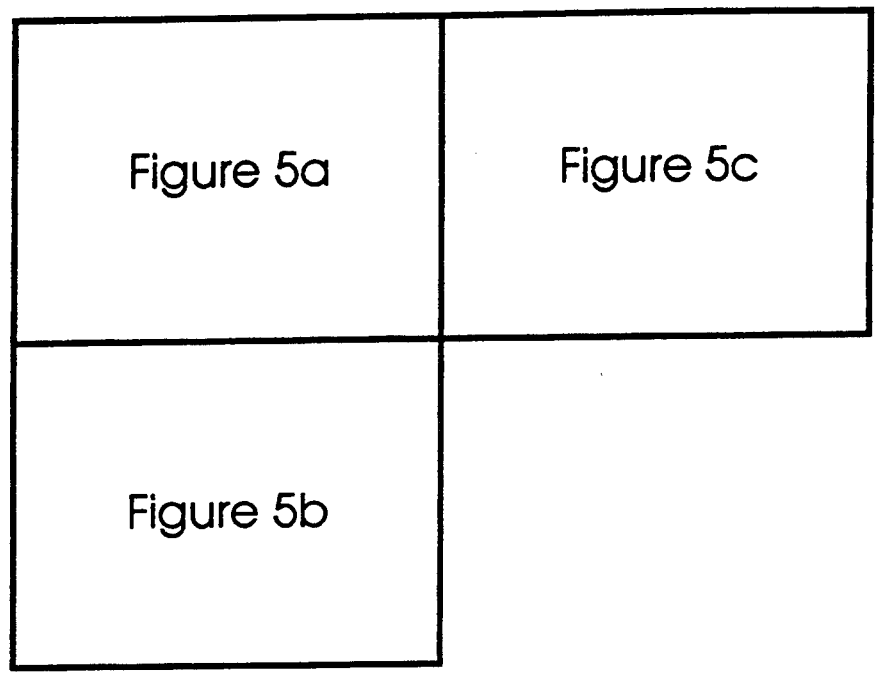
FIG. 4 is a diagram showing the proper arrangement of FIGS. 5a, 5b, and 5c.
Figure 5A:
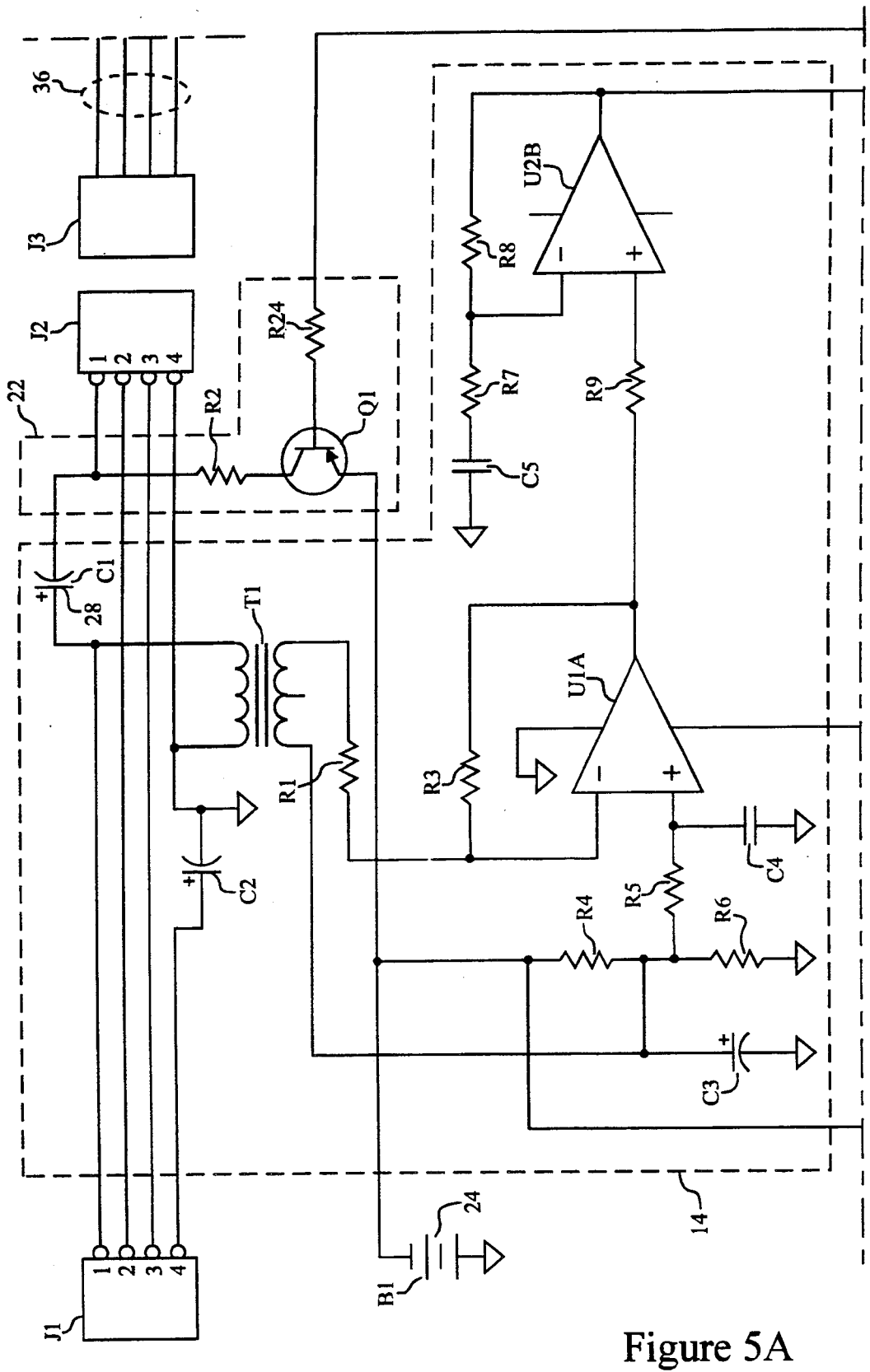
FIGS. 5a, 5b, and 5c, collectively arranged as shown in FIG. 4, form a schematic diagram of the in-use indicator of FIG. 1.
Figure 5B:
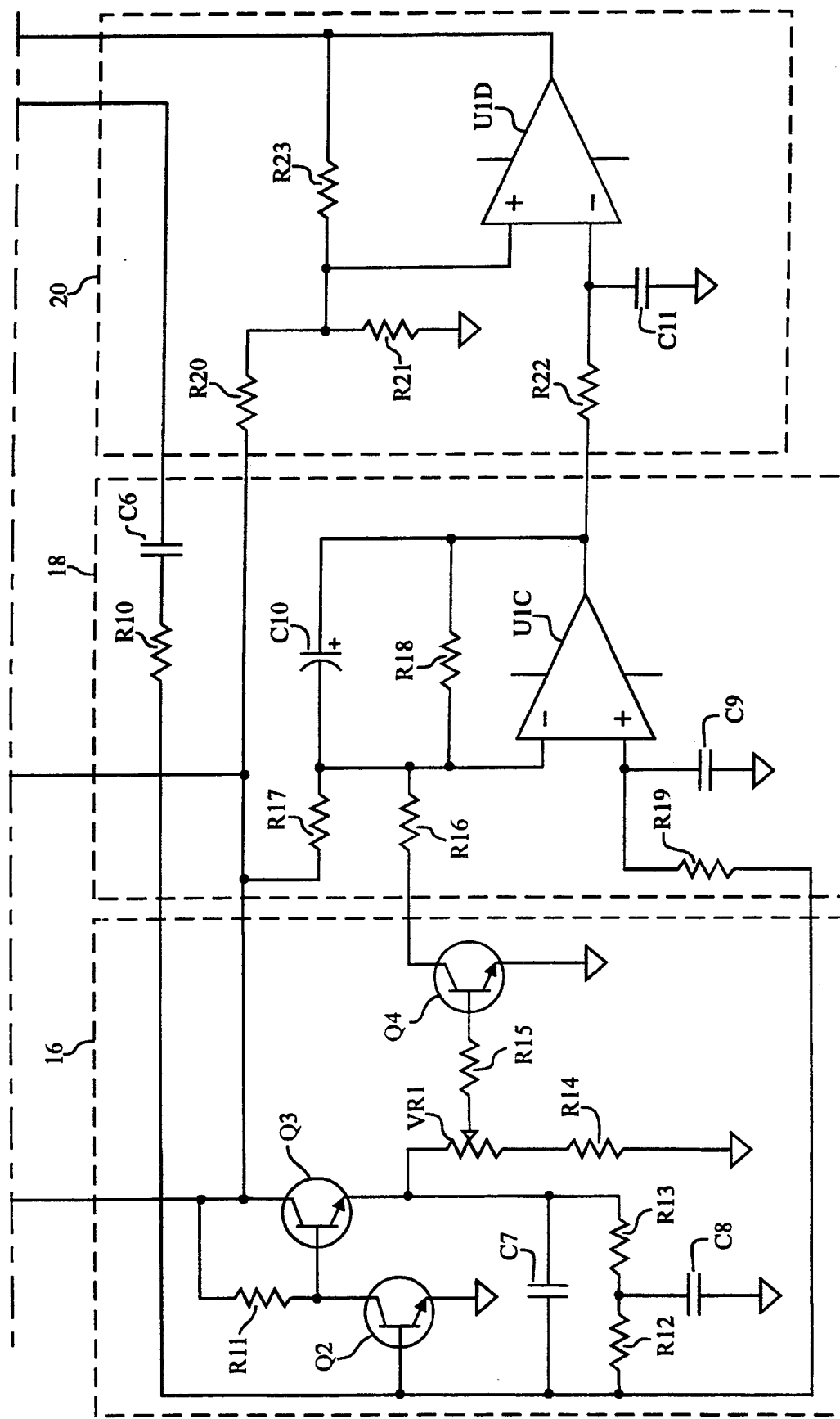
Figure 5C:
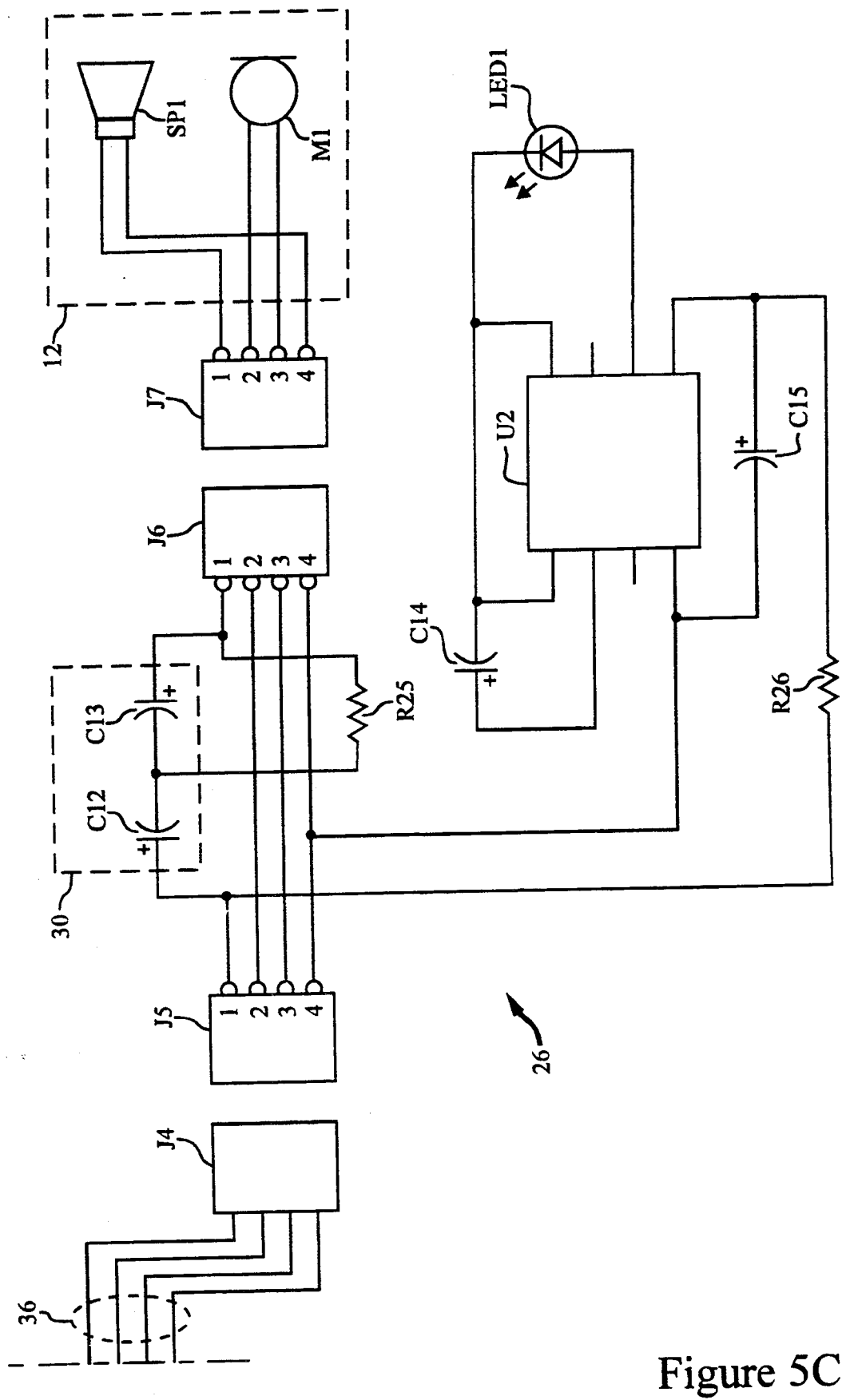
Figure 3:
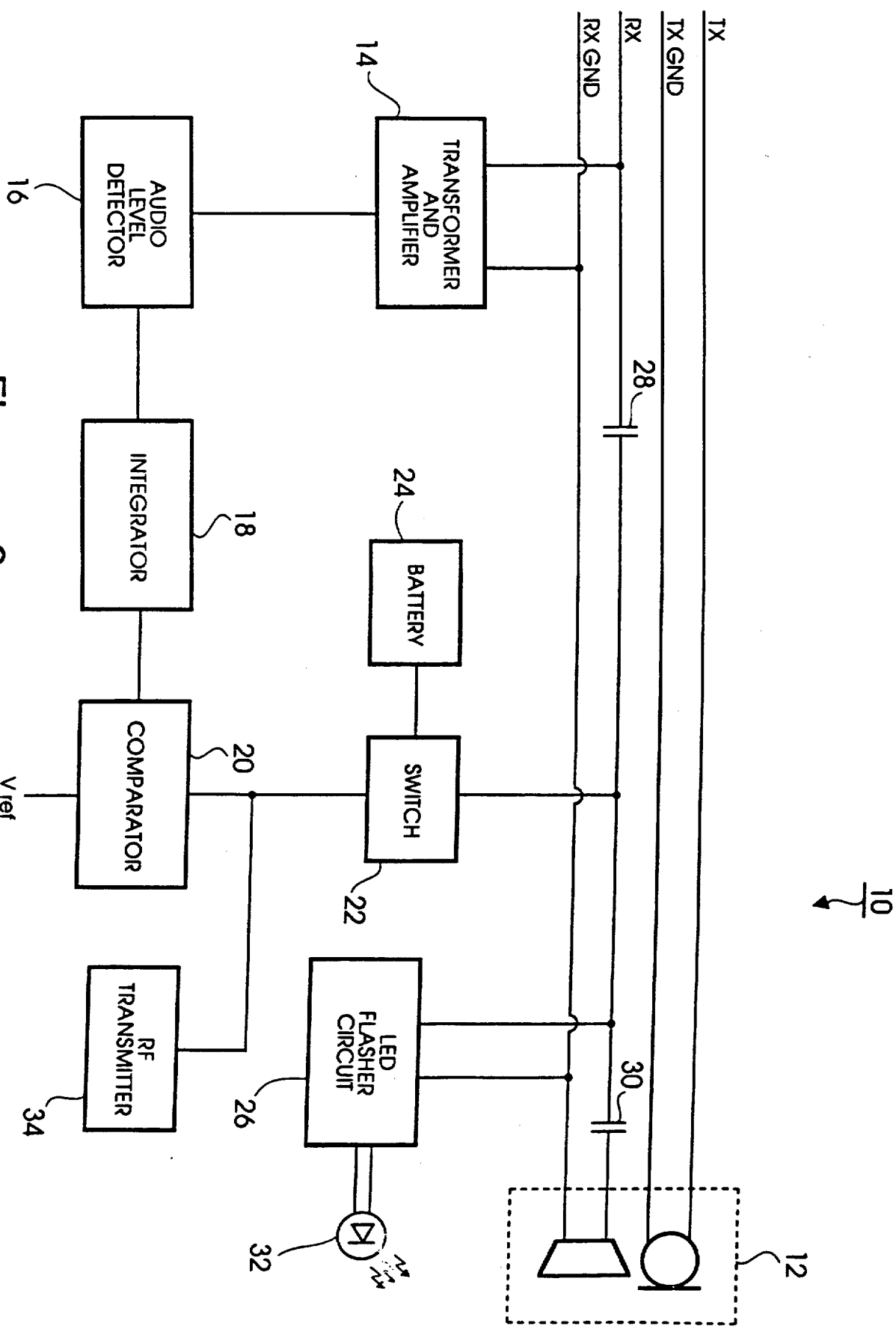

Turning now to FIG. 4, the manner in which FIGS. 5a, 5b, and 5c should be arranged to form a complete schematic diagram of the circuit depicted in block form in FIG. 1 is shown. In FIGS. 5a, 5b, and 5c, portions of circuitry corresponding to individual blocks in the block diagram of FIG. 1 are designated within dashed lines having the same reference numerals from FIG. 1. The particular component values for the components in the schematic diagram of FIGS. 5a, 5b, and 5c are set forth in the following Table 1:

TABLE 1

| COMPONENT | VALUE |
| --- | --- |
| R1 | 10 kΩ |
| R2 | 1 kΩ |
| R3 | 50 kΩ |
| R4 | 100 kΩ |
| R5 | 10 kΩ |
| R6 | 100 kΩ |
| R7 | 10 kΩ |
| R8 | 40 kΩ |
| R9 | 10 kΩ |
| R10 | 5 kΩ |
| R11 | 100 kΩ |
| R12 | 10 kΩ |
| R13 | 10 kΩ |
| R14 | 20 kΩ |
| R15 | 50 kΩ |
| R16 | 20 kΩ |

Referring to FIG. 5a, transformer and amplifier 14 is shown having a connector J1 adapted to be modularly connected to a telephone base unit, in a conventional manner. Transformer T1 is coupled to the RX and RX GND lines, as previously described. In the presently preferred embodiment of the invention, most of the circuitry of in-use indicator 10, including transformer and amplifier 14, audio level detector 16, integrator 18, comparator 20, RF transmitter 34 (if included), switch 22, and battery 24, is contained within a separate housing, not shown, which is coupled via connector J1 to the telephone system base unit. In-use indicator 10 is further provided with a modular connector J2 which connects to a matching connector J3 on one end of a headset cord 36. In this way, the bulk of the circuitry of in-use indicator 10 may be left near the base unit of the telephone system, and will therefore not add significantly to the size or weight of headset 12. As shown in FIG. 5c, a connector J4 is supplied at the other end of headset cord 36, with connector J4 being connected to connector J5 on a segment of headset cord having flashing LED in-use indicator 32 disposed thereon. Headset 12 itself is then coupled to this segment of the cord by means of connectors J6 and J7. This enables the wearer of headset 12 to readily detach headset 12 and move away from the base unit and in-use indicator circuit without the necessity of removing headset 12.

From the foregoing detailed description of a particular embodiment of the invention, it should be apparent that an in-use indicator for a telephone headset has been disclosed. Although a particular embodiment of the invention has been described herein in detail, this has been done for the purposes of illustration only, and is not to be taken as limiting with respect to the scope of the present invention. It is contemplated by the inventors that various alterations, substitutions, and modifications may be made to the embodiment of the invention disclosed herein without departing from the spirit and scope of the invention as defined in the claims, which follow.

What is claimed is:

1. A telephone headset in-use indicator, comprising:
   a headset having a microphone coupled to a telephone base unit by first and second transmit signal lines and having a receiver coupled to a telephone base unit by first and second received audio signal lines;
   a transformer and amplifier circuit, coupled to said first and second received audio signal lines, said transformer and amplifier circuit producing an amplified received audio signal;

an audio level detector, coupled to said transformer and amplifier circuit and responsive to peaks in said amplified received audio signal exceeding a first predetermined threshold to produce current pulses;

an integrator circuit, coupled to said audio level detector, said integrator circuit producing an integration signal reflecting a time-average of said current pulses produced by said audio level detector;

a comparator, coupled to said integrator, said comparator responsive to excursions of said integration signal above a second predetermined level to issue an activation signal having a predetermined digital logic level;

a switch coupled to said comparator and to a battery, said switch being responsive to said issuance of said activation signal by said comparator to apply a DC voltage from said battery to said first received audio signal line;

an LED flasher circuit, coupled to said received audio signal lines and responsive to said DC battery voltage on said first received audio line to provide a visual indication of headset use.

2. A telephone headset in-use indicator in accordance with claim 1, further comprising first and second DC isolation capacitors, coupled in series with said first received audio signal line, said first and second capacitors isolating said DC battery voltage from said headset and said telephone base unit.

3. A telephone headset in-use indicator in accordance with claim 1, further comprising a second, remote in-use indicator; and an RF transmitter coupled to said comparator and responsive to said issuance of said activation signal by said comparator to transmit an RF signal to said second, remote in-use indicator.

4. A telephone headset in-use indicator, comprising:

a headset having a microphone coupled to a telephone base unit by first and second transmit signal lines and having a receiver coupled to a telephone base unit by first and second received audio signal lines;

an amplifier circuit, coupled to said first and second received audio signal lines, said amplifier circuit producing an amplified received audio signal;

an audio level detector, coupled to said amplifier circuit and responsive to excursions of said amplified received audio signal above a first predetermined threshold to produce current pulses;

an integrator circuit, coupled to said audio level detector said integrator circuit producing an integration signal reflecting a time-average of said current pulses produced by said audio level detector;

a comparator, coupled to said integrator and responsive to excursions of said integration signal above a second predetermined level to issue an activation signal having a predetermined digital logic level;

a switch coupled to said comparator and to a battery, said switch being responsive to said issuance of said activation signal by said comparator to apply a DC voltage from said battery to said first received audio signal line;

a visual indicator, coupled to said received audio signal lines and responsive to said DC battery voltage on said first received audio line to provide a visual indication of headset use.

5. A telephone headset in-use indicator in accordance with claim 4, wherein said visual indicator is an LED.

6. A telephone headset in-use indicator in accordance with claim 4, further comprising a second, remote in-use indicator; and a transmitter coupled to said comparator and responsive to issuance of said activation signal by said comparator to transmit a signal to said second, remote in-use indicator.

7. A telephone headset in-use indicator in accordance with claim 6, wherein said transmitter is a radio-frequency transmitter.

8. A telephone headset in-use indicator in accordance with claim 6, wherein said transmitter is an infrared transmitter.

9. A telephone headset in-use indicator in accordance with claim 6, wherein said transmitter is an ultrasonic transmitter.

* * * * *

UNITED STATES PATENT AND TRADEMARK OFFICE
CERTIFICATE OF CORRECTION

PATENT NO. : 5,359,647

DATED : October 25, 1994

INVENTOR(S) : Regen, et al

It is certified that error appears in the above-identified patent and that said Letters Patent is hereby corrected as shown below:

In the drawing:

Delete Drawing Sheet 3 of 7, consisting of Figure 3, and substitute therefor, the Drawing Sheet, consisting of Figure 3, as shown on the attached page.

Column 4, line 18, the remainder of Table 1, should be insert as follows:

| | |
|---|---|
| R17 | 1MΩ |
| R18 | 1MΩ |
| R19 | 50kΩ |
| R20 | 100kΩ |
| R21 | 100kΩ |
| R22 | 10kΩ |
| R23 | 500kΩ |
| R24 | 100kΩ |
| R25 | 2kΩ |
| C1 | 100$\mu$F |
| C2 | 100$\mu$F |
| C3 | 100$\mu$F |
| C4 | 0.1$\mu$F |
| C5 | 0.1$\mu$F |
| C6 | 0.01$\mu$F |
| C7 | 0.01$\mu$F |
| C8 | 0.1$\mu$F |
| C9 | 0.1$\mu$F |

UNITED STATES PATENT AND TRADEMARK OFFICE
CERTIFICATE OF CORRECTION

PATENT NO. : 5,359,647      Page 2 of 3

DATED : October 25, 1994

INVENTOR(S) : Regen, et al

It is certified that error appears in the above-indentified patent and that said Letters Patent is hereby corrected as shown below:

| | |
|---|---|
| C10 | 2.2$\mu$F |
| C11 | 0.01$\mu$F |
| C12 | 100$\mu$F |
| C13 | 100$\mu$F |
| C14 | 100$\mu$F |
| C15 | 220$\mu$F |
| U1a-d | ICL7642 |
| U2 | LM3909 |
| Q1 | 2N5087 PNP transistor |
| Q2 | 2N5210 NPN transistor |
| Q3 | 2N5210 NPN transistor |
| Q4 | 2N5210 NPN transistor |
| T1 | 24826-01 Transformer |
| B1 | 3VDC Battery |

Signed and Sealed this

Fourteenth Day of February, 1995

Attest:

BRUCE LEHMAN

*Attesting Officer*     *Commissioner of Patents and Trademarks*